R. L. LYNCH.
AUTOMOBILE TIRE.
APPLICATION FILED DEC. 14, 1914.
1,164,946.
Patented Dec. 21, 1915.
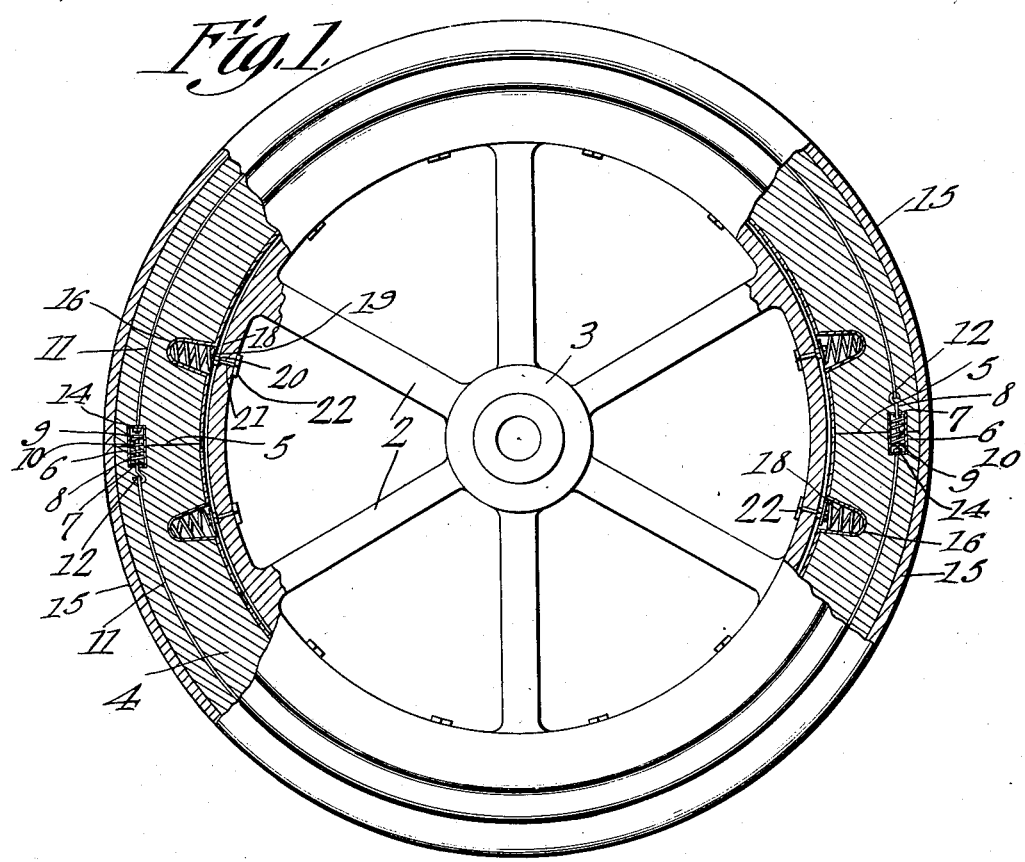
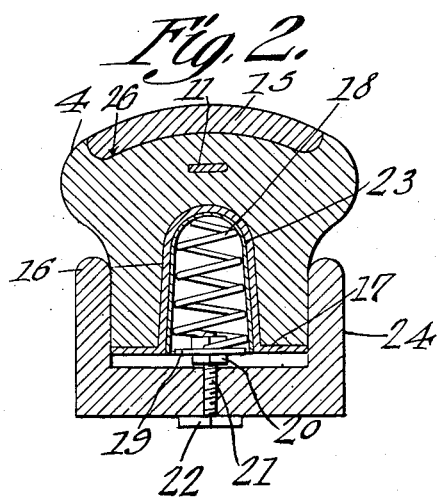
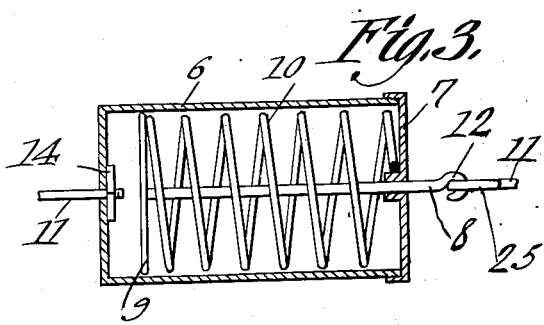
Witnesses
R. L. Lynch
Inventor
by
Attorneys

UNITED STATES PATENT OFFICE.

ROBERT LEE LYNCH, OF CAMPBELLSBURG, KENTUCKY.

AUTOMOBILE-TIRE.

1,164,946.

Specification of Letters Patent. Patented Dec. 21, 1915.

Application filed December 14, 1914. Serial No. 877,206.

*To all whom it may concern:*

Be it known that I, ROBERT L. LYNCH, a citizen of the United States, residing at Campbellsburg, in the county of Henry and State of Kentucky, have invented a new and useful Automobile-Tire, of which the following is a specification.

The device forming the subject matter of this application is an automobile tire and one object of the invention is to provide a device of this type in which pneumatic elements subject to puncture may be dispensed with.

A further object of the invention is to provide novel means whereby the tire may be detached from and attached to a wheel rim readily, novel means being provided for affording the desired resiliency.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings: Figure 1 shows the invention in side elevation, parts being broken away; Fig. 2 is a transverse section; Fig. 3 is a longitudinal section showing one of the casings.

In the drawings, the numeral 1 denotes a wheel rim embodying side flanges 24. The rim 1 is united with a hub 3 by means of spokes 2. Surrounding the rim 1 and located between the side flanges 24 is a tire 4 which preferably is fashioned from rubber. The tire 4 comprises two parts, the tire being divided transversely on lines 5.

Mounted terminally in the ends of the constituent parts of the tire 4 are casings 6 and attached to each casing by threading or otherwise is a cap 7 in which is mounted to slide a plunger 8 provided at its inner end with a head 9. A compression spring 10 abuts against the head 9 and against the cap 7. Securing strips 11 are provided the same being fashioned preferably of iron or steel. The securing strips 11 extend circumferentially of the tire 4 and are embedded therein. One end of each strip 11 is provided with an eye 25 and the other end of each strip is secured by means of a nut 14 or otherwise to the end of the casing 6, the plunger 8 being provided with a hook 12 adapted to engage in the eye 25.

In the periphery of the tire 4 there is formed a groove 26 in which is detachably fitted a tread strip 15, the same being flexible and if desired resilient. The tread strip 15 may be made of any desired substance. Embedded in the inner face of the tire 4 are casings 16 which preferably are fashioned from steel, the casings having flanges 17 which engage the inner face of the tire 4. Located within the casings 16 are compression springs 18. The casings 16 may be lined with rubber or the like as shown at 23, in order that the springs may work noiselessly. The outer ends of the springs 18 exert a pressure against the outer ends of the casings 16 and the inner ends of the springs 18 bear against disks 19 held by means of nuts 20 on bolts 21 which are threaded into the rim 1, the bolts 20 being provided with turning heads 22.

In practical operation, the constituent parts of the tire 4 are placed about the rim 1 and the said parts of the tire are operatively united by engaging the eyes 25 of the strips 11 in the hooks 12 of the plungers 8. The tire 4 then fits somewhat loosely about the wheel rim 1 and the tread strip 15 may be mounted readily in place in the groove 26. Then the bolts 21 are rotated in the rim 1 so as to advance the disks 19 and put the springs 18 under compression. The tire 4 thus is forced outwardly and expanded circumferentially, the tire at the same time being supported yieldingly by the springs 18 as will be understood best from Fig. 2.

From the foregoing it will be seen that the construction of the device is such that the strip 15 may be renewed at any time without difficulty and, if desired, the tire 4 may be replaced with a minimum expenditure of effort and by an operation calling for tools of the simplest sort.

Having thus described the invention, what is claimed is:—

In a device of the class described, a tire which is divided transversely to form a plurality of parti-circumferential sections, the tire being provided with a tread groove; a tread strip detachably mounted in the tread groove; a rim; springs exerting an outward thrust against the tire to force the sections thereof outwardly and to seat the tread strip firmly thereon; adjusting devices in the rim and engaging the springs; binding strips located in the sections of the tire; and means for resiliently connecting the binding strips with each other.

In testimony that I claim the foregoing as my own, I have hereto affixed my signature in the presence of two witnesses.

ROBERT LEE LYNCH.

Witnesses:
  JESSE W. GIDDENS,
  J. W. BOOTH.